United States Patent
Emami

[11] Patent Number: 6,061,405
[45] Date of Patent: *May 9, 2000

[54] TIME DOMAIN SOURCE MATCHED MULTICARRIER QUADRATURE AMPLITUDE MODULATION (QAM) METHOD AND APPARATUS

[75] Inventor: Shahriar Emami, Sunrise, Fla.

[73] Assignee: Motorola, Inc., Schaumburg, Ill.

[*] Notice: This patent is subject to a terminal disclaimer.

[21] Appl. No.: 08/990,273

[22] Filed: Dec. 15, 1997

[51] Int. Cl.$^7$ .............. H04K 1/10; H04L 27/28; H04L 23/02; H04L 5/12

[52] U.S. Cl. .............. 375/260; 375/261; 375/298; 370/345; 370/436; 370/442; 370/458; 370/464; 370/498; 370/478; 370/536; 370/543; 370/544; 455/59; 455/103; 455/104; 455/522

[58] Field of Search .............. 375/260, 261, 375/298; 370/536, 345, 442, 458, 478, 498, 542, 543, 544, 464, 436; 455/59, 103, 104, 522

[56] References Cited

U.S. PATENT DOCUMENTS

| | | |
|---|---|---|
| 4,679,277 | 7/1987 | Hughes-Hartogs .............. 379/98 |
| 4,731,816 | 3/1988 | Hughes-Hartogs .............. 379/98 |
| 4,833,706 | 5/1989 | Hughes-Hartogs .............. 379/98 |
| 5,054,034 | 10/1991 | Hughes-Hartogs .............. 375/8 |
| 5,479,447 | 12/1995 | Chow et al. .............. 375/260 |
| 5,822,372 | 10/1998 | Emami .............. 375/260 |
| 5,832,387 | 11/1998 | Bae et al. .............. 455/522 |
| 5,960,003 | 9/1999 | Fischer et al. .............. 370/468 |

*Primary Examiner*—Stephen Chin
*Assistant Examiner*—Michael W. Maddox
*Attorney, Agent, or Firm*—Andrew S. Fuller; ValJean F. Hillman

[57] ABSTRACT

A multicarrier transmission system (100) routes data symbols from a data source (142) to a multicarrier modulator (145). Each modulator (201, 202, 203) within the multicarrier modulator (145) is coupled to a corresponding gain adjuster (211, 212, 213) that distributes the available transmit power across various subcarriers. Power distribution, is determined in part, upon the noise sensitivity of the transmitted information. In accordance, data stream symbols of like sensitivity are grouped (520) and transmitted during defined time intervals. Each such group is assigned a unique transmission power level (530). At any given moment in time, all subcarrier transmission power levels will have an identical amplitude, thereby mitigating the impact of subchannel-to-subchannel interference.

16 Claims, 3 Drawing Sheets

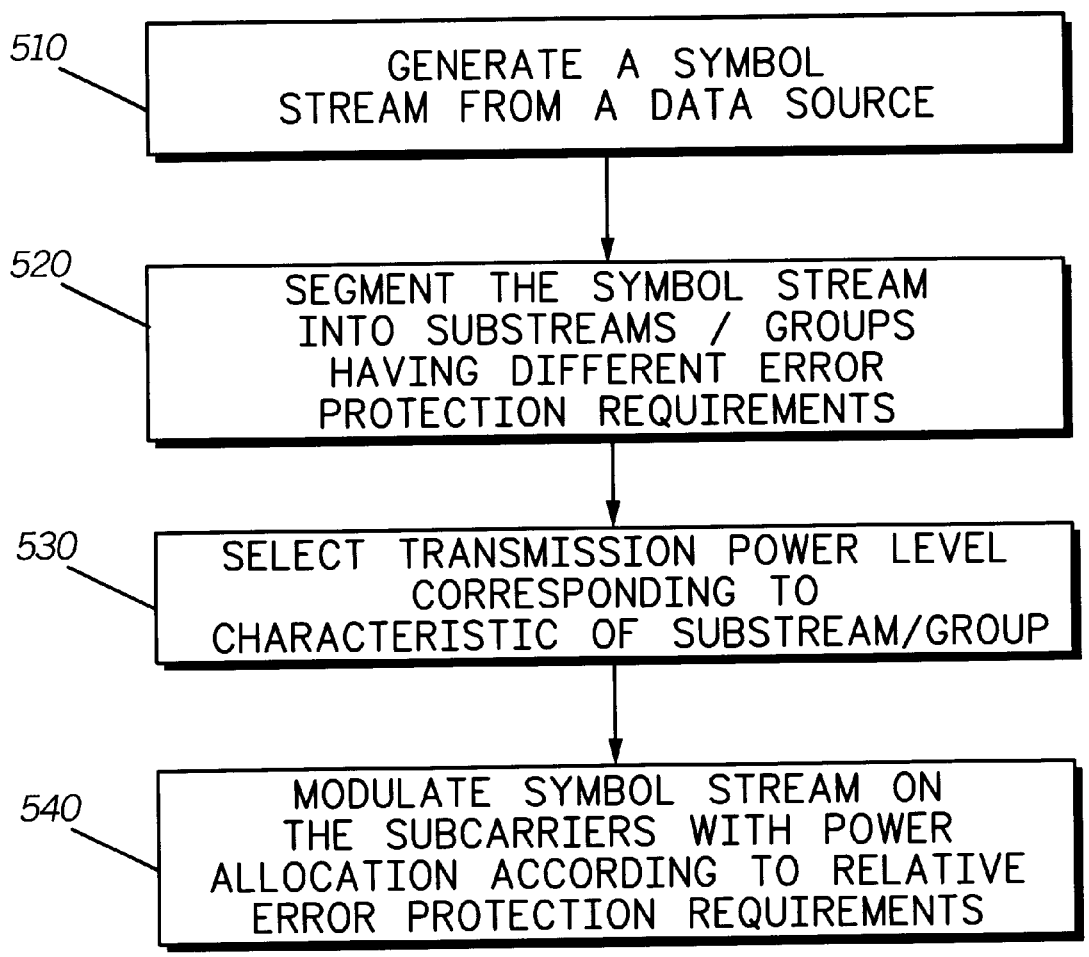

TIME DOMAIN SOURCE MATCHED MULTICARRIER QUADRATURE AMPLITUDE MODULATION (QAM) METHOD AND APPARATUS

RELATED INVENTION

This invention is related to patent application Ser. No. 08/691,252, filed Aug. 2, 1996, now U.S. Pat. No. 5,822, 372, titled MULTICARRIER SYSTEM USING SUBCHANNEL CHARACTERISTICS TO IMPLEMENT DIFFERENT ERROR RATES WITHIN A DATA STREAM, and assigned to the assignee of the present invention.

TECHNICAL FIELD

This invention relates in general to multicarrier communication systems, and more particularly, to the provision of error protection for data transmitted using a multicarrier transmission system.

BACKGROUND OF THE INVENTION

Multicarrier modulation has been gaining popularity over single carrier modulation for the transmission of wireless digital signals in a radio communication system. Multicarrier modulation offers increased flexibility over a single carrier modulation by providing opportunities to optimize transmission bandwidth. In a multicarrier modulation scheme, such as multicarrier quadrature amplitude modulation (MCQAM), multiple subcarriers are employed to transmit a particular bit or symbol stream. Typically, the bit stream is divided into multiple parallel bit streams, corresponding in number to the subcarriers. The subcarrier corresponding to each bit stream is modulated by quadrature amplitude modulation (QAM). The modulated subcarriers are then combined, such as by multiplexing, to generate a composite signal. The use of MCQAM reduces the need for system equalization and provides opportunities for enhancing total data throughput, or overall system performance.

In a typical wireless communication system, the presence of noise may affect the receipt and processing of a communicated signal. The impact of such noise varies depending on the environment, which may include factors such as the presence of interfering communications (active interference), passive interference within the communication signal path, and the like. Most sophisticated digital communication systems make some provision to mitigate the effects of noise on communications. For example, a digital signal may be encoded with error correction information, which is used to provide a level of error mitigation. As known, error encoding involves the addition of redundancy bits to encoded data in order to provide for error correction at the receiving end of the signal. As required, different portions of a data stream may be provided with different levels of error protection by using error correction codes with differing coding rates.

While the use of error correction codes provides for mitigation of channel induced errors, the error correction codes typically account for a substantial portion of the transmitted data. As a consequence, additional processing is typically required for encoding and decoding the error correction codes. While, the burdens introduced by correction coding are generally accepted as a necessary to provide data transmission with acceptable error rates, commonly used techniques, such as convolutional encoding and decoding require the addition of computational resources at the transmit and receive ends of the communicated signal, thereby increasing the cost of the overall system.

While, it has been suggested that providing different error rates at different portions of a data stream is a desirable form of error correction, it has likewise been noted that providing different power distribution levels at different portions of a data stream is an alternative form of error correction that may avoid the need of adding error correction information to the transmitted data. Implementation of such a scheme must necessarily take into consideration the spectral permutation of subchannels (i.e., subchannel-to-subchannel interference). It would be extremely advantageous therefore to provide a time domain source matched multicarrier quadrature amplitude modulation method and apparatus that is insensitive to subchannel permutation.

BRIEF DESCRIPTION OF THE DRAWINGS

FIG. 5 is a flowchart diagram depicting the procedures for determining modulation energy distribution in order to implement a specific error protection scheme, in accordance with the present invention.

DETAILED DESCRIPTION OF A PREFERRED EMBODIMENT

Figure 1:
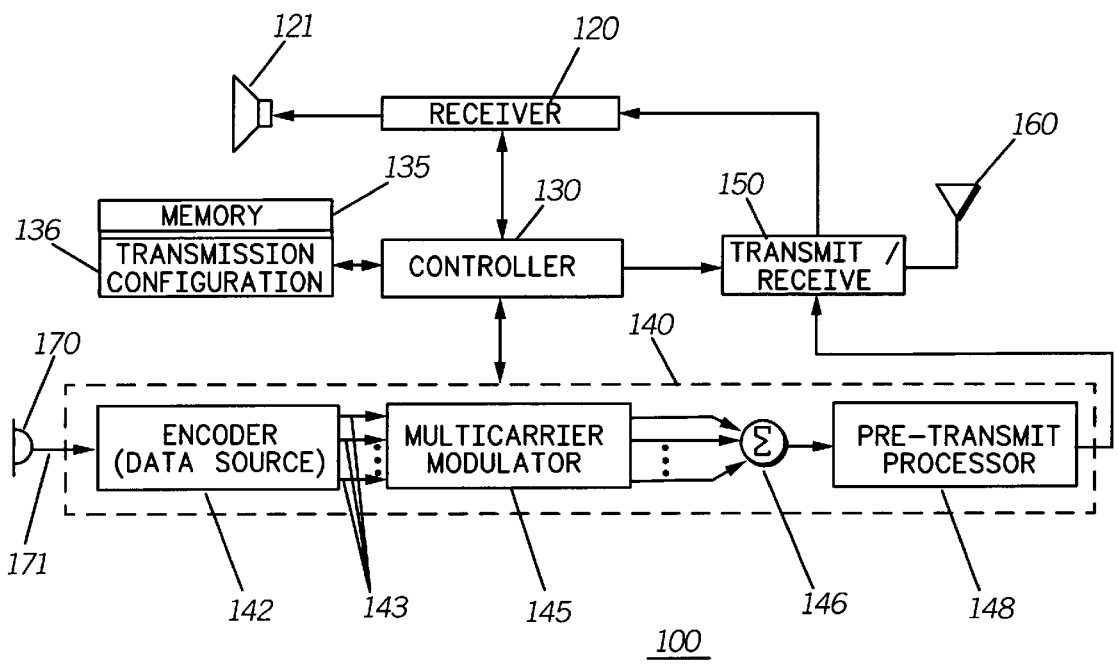
FIG. 1 is a block diagram of a two-way communication device having a multicarrier transmitter.

The present invention provides for a multicarrier or multiplexing transmission system that uses different transmission characteristics on different subcarriers to implement error protection requirements for a transmitted data stream. In operation, a data stream obtained for transmission is segmented into multiple substreams having different error protection requirements, and assigned to subcarriers based on error protection requirements. The transmission characteristics of the subcarriers are manipulated, according to a selected transmission configuration, to effect the combined error protection requirements. In the preferred embodiment, the subcarriers are modulated by allocating available power based, at least in part, on subchannel or substream sensitivity to subchannel permutation.

While the specification concludes with claims defining the features of the invention that are regarded as novel, it is believed that the invention will be better understood from a consideration of the following description in conjunction with the drawing figures, in which like reference numerals are carried forward.

FIG. 1 is a block diagram of a radio communication device 100 that incorporates multicarrier transmission features, in accordance with the present invention. The communication device 100 is a two-way radio transceiver having circuitry for communicating over radio frequency channels in a multicarrier communication system. A multicarrier system as used herein refers to the use of multiple subcarriers in a common transmission medium to simultaneously transmit two or more information signals in such a manner that the information signals may be discretely recovered. The terms "subcarrier" and "subchannel" are used interchangeably herein. In the preferred embodiment, information signals are multiplexed for transmission using a modified version of 16 point Quadrature Amplitude Modulation (16QAM).

The communication device 100 includes a controller 130 that provides operational control for various functions, including receive and transmit operations. During receive operations, a transmit/receive switch 150 is engaged to selectively couple an antenna 160 to a receiver 120. Signals from the receiver 120 are processed under control of the controller 130 to provide an output through a coupled speaker 121. During transmit operations, the transmit/receive switch 150 is engaged to couple a transmitter 140 to the antenna 160. In a typical transmit operation, audio signals 171 from a microphone 170 are coupled to a speech encoder 142, which functions as a data source to a multicarrier modulator 145. The encoder or data source 142 generates a stream of data symbols or bits 143. The multicarrier modulator 145 generates modulated signals on multiple subcarriers or subchannels, which modulated signals represent the data symbol stream 143. The modulated signals are combined at a combiner 146 and undergo any necessary processing at a pre-transmit processor 148 before being transmitted through the antenna 160 via the transmit/receiver switch 150. The controller 130 provides operational control of the communication device 100 according to instructions and data stored in memory 135. The memory 135 may further include transmission configuration information 136 that is used to operate the multicarrier modulator 145 to implement error protection based on relative error protection requirements for various portions of a data stream.

In a typical application, the radio communication device 100 transmits information signals, such as speech or image data, in digital form. Analysis of such data has shown that some portions of the data are more sensitive than others to channel errors, and thus require greater error protection to yield acceptable results at the receiving end. According to the present invention, error protection for those portions of data exhibiting varying sensitivity to channel errors is accomplished, in part, through the establishment of unique energy or power distribution levels for use during the interval associated with the transmission of data exhibiting said varying sensitivity. The establishment of several of such energy or power distribution levels, permits the system of the present invention to handle the transmission of data having varying degrees of sensitivity. Modulating said energy or power distribution levels with respect to time tends to overcome the excessive subchannel-to-subchannel interference).

Figure 2:
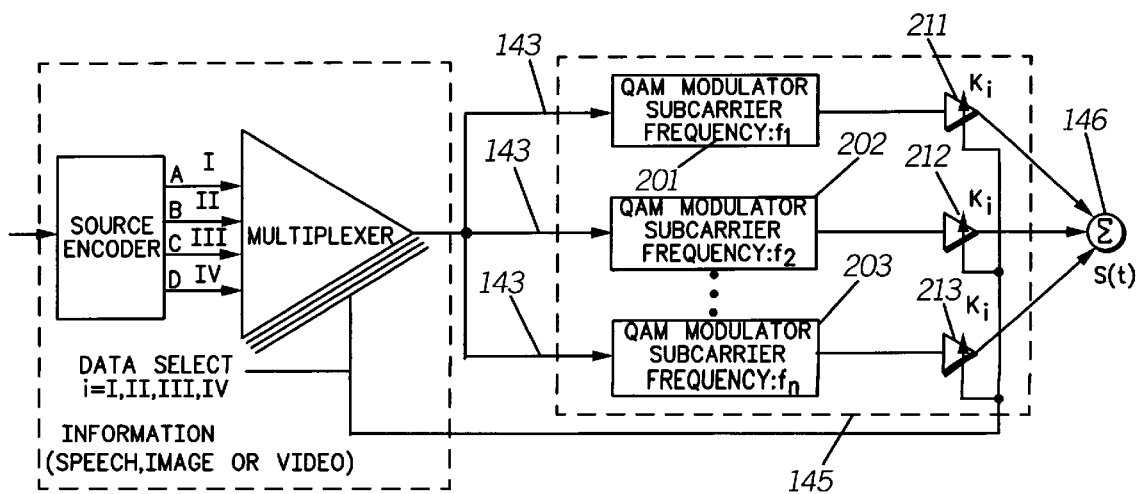
FIG. 2 is a block diagram highlighting features of the multicarrier transmitter of FIG. 1, in accordance with the present invention.

FIG. 2 is a block diagram of the multicarrier modulator 145 highlighting error mitigation based on manipulation of transmission characteristics of subcarriers, in accordance with the present invention. The modulator 145 includes modulators 201, 202, 203, for each subcarrier of the multicarrier transmission system. Although represented as separate modulators 201, 202, 203, for illustration purposes, the implementation of the multicarrier modulator may differ without departure from the concepts embodied by the present invention. Each modulator 201, 202, 203 is coupled to a corresponding gain adjuster 211, 212, 213, to distribute available transmit power across the various subcarriers. Power distribution, in accordance with the present invention is based, at least in part, on the sensitivity of the transmitted information. In accordance with the present invention, data stream symbols of like sensitivity are grouped and transmitted during defined time intervals. Each such group is assigned a unique transmission power level. In accordance, all subcarrier transmission power levels will have an identical amplitude at any given moment in time. This modified multicarrier QAM scheme is referred to herein as time domain source matched multicarrier quadrature amplitude modulation (TDSM-MCQAM).

The multicarrier modulator operates using energy distribution for transmitted data optimized across the subchannels based on data content and expected channel characteristics. In the preferred embodiment, the energy per group is characterized based on the type of channel in which communication is required. For fading channels, the energy per group, $E_i$, can be can be expressed as:

$$E_i = \frac{E}{\sum_{k=1}^{N} P_{b_i} / P_{b_k}}$$

where,

N is the number of data groups;

$E_i$ is the energy allocated to the $i^{th}$ group;

E is the total available energy; and $P_{b_i}/P_{b_k}$ is the ratio of desired error rate, such as bit error rate (BER), in the $i^{th}$ group to desired error rate in the $k^{th}$ group.

For additive white Gaussian noise (AWGN) channels, the energy per group, $E_i$, can be expressed as:

$$E_i = \frac{E}{NN_o} - \beta \log_e \sqrt[N]{\prod_{i=1}^{k} (P_{b_i} / P_{b_k})};$$

where,

β is a constant dependent on the type of subcarrier modulation, and has a value of ten (10) for 16QAM used in the preferred embodiment;

$N_o$ is a spectral density value for noise; and

N, E, and $P_{b_i}/P_{b_k}$ are as described above.

The energy distribution characteristics from the above equations are preferably predetermined for a particular data source or data content and known channel conditions, and stored as transmission configuration information. The multicarrier modulator is appropriately configured with the transmission configuration information to reflect data transmission requirements. In accordance with the present invention, at any given moment in time, the subchannels will have nearly identical power levels. Over time, the power levels may change in response to the symbol sensitivity of transmitted information.

Figure 3:
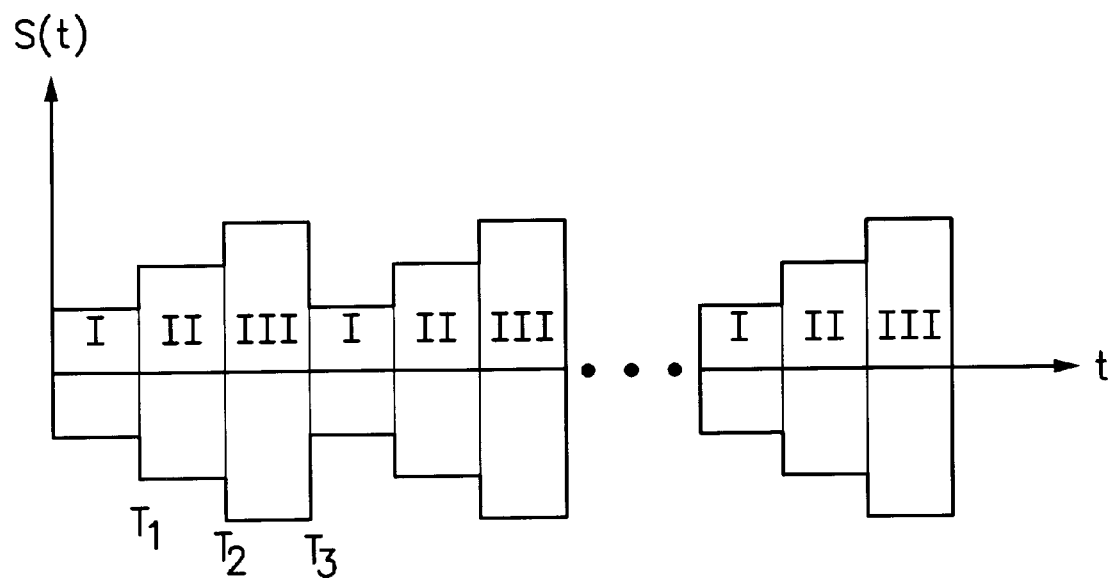
FIG. 3 is a graph depicting the time domain response of the multicarrier transmitter of FIG. 1.
Figure 4:
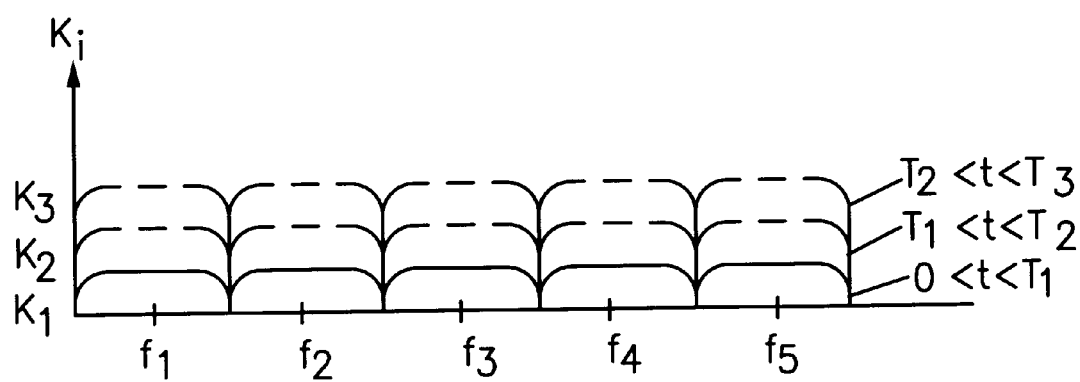
FIG. 4 is a graph depicting the frequency domain response of the multicarrier transmitter of FIG. 1.

FIGS. 3 and 4 are graphs which collectively depict the operation of the multicarrier communication system 100 anticipated by the present invention. By way of example and not by way of limitation the multicarrier system in question has 5 subchannels or subcarriers (centered on frequencies, $f_1$, $f_2$, $f_3$, $f_4$, and $f_5$ as seen in FIG. 4), and three groups (i.e., I, II, and III as seen in FIG. 3). As will be appreciated, a group is defined as a portion of a data symbol stream wherein the symbols comprising the group have a like sensitivity to channel errors.

With further reference to the drawings, FIG. 3 is a graph depicting the envelope of time domain transmitted signal by the multicarrier transmitter of FIG. 2. As will be noted, during time interval $0<t<T_1$, data stream symbols of like sensitivity are grouped into group I and transmitted. During this time interval, all subchannels (e.g., $f_1$, $f_2$, $f_3$, $f_4$, and $f_5$) exhibit an equal power level. As previously mentioned, the power level selected for use during interval $0<t<T_1$ is selected, at least in part, upon the sensitivity of the information in group I, to channel errors. In accordance with the preferred embodiment, this power level information is maintained in memory 135 as transmission configuration 136.

During the time interval $T_1<t<T_2$, data stream symbols of like sensitivity are grouped into group II and transmitted. During this time interval, all subchannels (e.g., $f_1$, $f_2$, $f_3$, $f_4$, and $f_5$) operate at the same power level. As previously mentioned, the power level selected for use during the interval $T_1<t<T_2$ is selected, at least in part, upon the sensitivity of the information in group II, to channel errors. As will be noted, the power level for group II is greater than that exhibited by group I indicating a greater degree of sensitivity to channel errors.

During time interval $T_2<t<T_3$, data stream symbols of like sensitivity are grouped into group III and transmitted. During this time interval, all subchannels (e.g., $f_1$, $f_2$, $f_3$, $f_4$, and $f_5$) operate at the same power level, albeit higher than the levels exhibited by group I or II. As previously mentioned, the power level selected for use during interval $T_2<t<T_3$ is selected, at least in part, upon the sensitivity of the information in group III, to channel errors. In accordance with the preferred embodiment, group I is the least sensitive to channel errors while group III is the most sensitive.

FIG. 4 is a graph depicting the frequency domain response of the multicarrier transmitter of FIG. 1. As will be noted, at any given moment in time, the energy per subchannel is nearly identical. Over time, however, the power levels will change in response to the symbol sensitivity (e.g., $K_1$, $K_2$, or $K_3$) of transmitted information. $K_i$ is selected such that the signal energy at the output of each gain adjuster stage is $E_i$.

Continuing with reference to the drawings, FIG. 5 is a flowchart diagram depicting the procedures for determining modulation energy distribution in order to implement an error protection scheme, in accordance with the present invention.

Commencing at start block 500, flow proceeds to block 510 where a data symbol stream is generated from a data symbol source, such as a speech encoder, image encoder, and the like. At block 520, the data symbol stream is segmented into multiple substreams or groups, according to error protection requirements determined for each data symbol or portion of the data symbol stream. Preferably, a determination is made that a data symbol stream represents data from a particular data source and the symbols of the symbol stream are partitioned or segmented based on information characterizing the particular data source. Of note, the number of substreams or groups does not necessarily correspond to the number of available subchannels. Instead, each segment of the data stream, i.e., each substream or group, is assigned across the subchannel band based on required error protection, requirements.

In the preferred embodiment, a data transmission configuration is stored, which configuration relates to the implementation of error protection for data symbols associated with a particular data source. The data transmission configuration includes transmission power allocation per substream or group based on the error protection requirements for that substream or group. This data transmission configuration is selected at block 530 to govern modulation of the data symbols on the subcarriers by allocating available power according to relative error protection requirements among the data symbols, at block 540.

In summary, data symbols are routed from a data source to multiple modulators based on desired error protection for those portions of data exhibiting varied sensitivity to channel errors. Error protection is accomplished, in part, by grouping together symbols of like sensitivity and establishing unique energy or power distribution levels for use during an interval associated with the transmission of data exhibiting said like sensitivity. The establishment of several such energy or power distribution levels permits the system of the present invention to handle the transmission of data having varying degrees of sensitivity.

The present invention provides significant benefits over the prior art. By assigning a group of data symbols to subchannels based on their sensitivity, different error rates are provided without the need for encoded redundancy information. Thus, the transmission bandwidth and processing needed to handle redundancy symbols are eliminated, and a more efficient use of communication resources promoted. Modulating said energy or power distribution levels with respect to time eliminates the sensitivity to subchannel permutation; for at any given moment in time, the energy per subchannels will have nearly identical power levels, thereby avoiding excessive subchannel-to-subchannel interference.

What is claimed is:

1. In a multicarrier transmission system, a method comprising the steps of:

obtaining a symbol stream for transmission on a plurality of subchannels;

segmenting the symbol stream into a plurality of substreams having different error protection requirements, establishing a plurality of transmission power levels of differing amplitude;

transmitting a first substream for a first time interval at a first power distribution level on the plurality of subchannels; and transmitting a second substream for a second time interval at a second power distribution level on the plurality of subchannels.

2. The method of claim 1, wherein the step of segmenting the symbol stream comprises the steps of:

determining that the symbol stream represents data of differing noise sensitivity; and grouping portions of the symbol stream exhibiting like noise sensitivity.

3. The method of claim 1, wherein, at any given moment in time, the transmission power level exhibited by the plurality of subchannels is the identical.

4. The method of claim 1, wherein the plurality of substreams do not correspond in number to the plurality of subchannels.

5. The method of claim 1, wherein, the plurality of power distribution levels correspond in number to the plurality of substreams.

6. The method of claim 1, wherein transmission power level distribution is optimized for fading channels.

7. The method of claim 1, wherein transmission power level distribution is optimized for additive white Gaussian noise channels.

8. The method of claim 1, wherein, the plurality of power distribution levels do not correspond in number to the plurality of substreams.

9. In a communication device, a method comprising the steps of:

generating a symbol stream comprising a plurality of symbols for transmission on a plurality of subchannels;

segmenting the symbol stream into a plurality of substreams, each symbol within a respective substream exhibiting a like noise sensitivity;

establishing a plurality of transmission power levels of differing amplitude;

transmitting a first substream for a first time interval at a first transmission power level; and transmitting a second substream for a second time interval at a second transmission power level.

10. The method of claim 9, wherein the step of segmenting the symbol stream comprises the steps of:

determining that the symbol stream represents data of differing noise sensitivity; and grouping portions of the symbol stream exhibiting like noise sensitivity.

11. The method of claim 9, wherein the first substream has a noise sensitivity different than a noise sensitivity exhibited by the second substream.

12. The method of claim 9, wherein, the first and second substreams are transmitted over the plurality of subchannels.

13. The method of claim 12, wherein at any given moment in time, the transmission power level exhibited by the plurality of subchannels is the same.

14. In a multicarrier transmission system having a plurality of subchannels, a method of providing error protection for transmission of a data stream, the method comprising the steps of:

determining error protection requirements for segments of the data stream;

establishing a plurality of transmission power levels of differing amplitude;

assigning each segment of the data stream to one of the plurality of transmission power levels based on required error protection; and transmitting a segment of the data stream, during a time interval and at the assigned transmission power level, such that, at any moment in time, the transmission power level exhibited by the plurality of subchannels is the same.

15. The method of claim 14, further comprising the steps of:

storing transmission power level information in memory; and selecting transmission power level information from memory to govern modulation of the data stream as a function of data symbol noise sensitivity.

16. In a multiplexing transmission system having a plurality of subcarriers, a method of providing error control comprising the steps of:

routing data symbols from a data source to a plurality of modulators based on desired error protection for groups of data symbols; and modulating respective groups of data symbols on the plurality of subcarriers by allocating transmission power according to error protection requirements among the respective groups of data symbols.

* * * * *